United States Patent
Haloi et al.

(10) Patent No.: US 10,496,494 B1
(45) Date of Patent: Dec. 3, 2019

(54) MULTILAYER MANIFEST FOR DATA STORAGE SYSTEMS

(71) Applicant: EMC Corporation, Hopkinton, MA (US)

(72) Inventors: Saurav Haloi, Maharashtra (IN); Ganesh Ghodake, Maharashtra (IN); Girish Doshi, Kothrud (IN); Nathan E. Rosenblum, San Francisco, CA (US); Biju Shanmugham Pillai, Sunnyvale, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 738 days.

(21) Appl. No.: 15/087,792

(22) Filed: Mar. 31, 2016

(51) Int. Cl.
*G06F 16/00* (2019.01)
*G06F 11/14* (2006.01)
*G06F 16/14* (2019.01)
*G06F 16/22* (2019.01)

(52) U.S. Cl.
CPC ........ *G06F 11/1469* (2013.01); *G06F 16/148* (2019.01); *G06F 16/2228* (2019.01); *G06F 2201/80* (2013.01)

(58) Field of Classification Search
CPC .......................... G06F 17/30106; G06F 16/148
USPC ................................................. 707/674, 640
See application file for complete search history.

(56) References Cited

U.S. PATENT DOCUMENTS

| | | | | |
|---|---|---|---|---|
| 8,285,681 | B2 * | 10/2012 | Prahlad | G06F 3/0649 707/640 |
| 2007/0027935 | A1 * | 2/2007 | Haselton | G06F 11/1461 |
| 2014/0181579 | A1 * | 6/2014 | Whitehead | G06F 11/1451 714/15 |
| 2016/0210064 | A1 * | 7/2016 | Dornemann | G06F 16/27 |

* cited by examiner

*Primary Examiner* — Chelcie L Daye
(74) *Attorney, Agent, or Firm* — Womble Bond Dickinson (US) LLP

(57) ABSTRACT

A multilayer manifest enables any file written to an object store using a proprietary storage process, including large virtual machine backup images, to be recovered without being dependent on the proprietary storage process. Upon synchronizing a file written to an object store in cloud-enabled storage, a multilayer manifest process generates a family of manifest files in a self-contained format that represents all the necessary information required to reconstruct the file. The family of manifest files includes an ancestral record used to initiate retrieval of a file, and multiple layers of manifest files associated with the ancestral record. During retrieval, each of the one or more multilayer manifest files is successively reconstructed and used to securely retrieve the next manifest file until no further manifest files remain in the family. Reconstruction of the last multilayer manifest file results in the recovery of the file for which the manifest files were generated.

20 Claims, 7 Drawing Sheets

Manifest File Format 500

| |
|---|
| Version |
| Level (where 0 is root manifest level, 1, 2, ..., N, where N is Retrieval Manifest) |
| Compression Type (None=0, LZNT1=2, DEFLATE=4, SNAPPY=8, LZ4=16) |
| Encryption Algorithm |
| Number of Chunks |
| Size of File |
| Offset, Container Index, Object-ID, Base 64(Encryption Token), Offset, Container Index, Object-ID, Base 64(Encryption Token) ... Offset, Container Index, Object-ID, Base 64(Encryption Token). For sparse files, Offset, Container Index, HOLES, Length of Hole* |
| Container1, Container2, Container3, ... Container N |

* Where Container Index points to a container/bucket name in the object storage. In case of a HOLES container, the name is represented by word "EMPTY"

File Info 502 — {Version ... Size of File}
Chunk Info 504 — {Offset, Container Index ... Length of Hole*}
Container Info 506 — {Container1 ... Container N}

MULTILAYER MANIFEST FOR DATA STORAGE SYSTEMS

FIELD OF THE INVENTION

Embodiments of the present invention relate generally to data storage systems. More particularly, embodiments of the invention relate to storing and retrieving files from data storage systems using deduplication.

BACKGROUND

In response to unprecedented growth in the amount of data generated in modern computing environments, data storage systems are leveraging object storage paradigms and cloud-based storage. Object storage paradigms store data in chunks and deduplicate the chunks to minimize or eliminate redundant storage of data. Cloud-based storage enables data storage systems to meet elastic demands for capacity and scale, while providing mobile access to data.

In the context of data protection, EMC Data Protection Suite and EMC CloudBoost data storage technologies provided by EMC Corporation, enable cloud-based storage for file backups, archives and for any long-term retention (LTR) needs using any industry standard backup solution such as EMC Networker, to facilitate secure, automatic, efficient data protection for data stored both onsite and in private and/or public clouds.

One of the advantages of using EMC CloudBoost to enable cloud-based storage is that it exposes an object store to an application as a conventional file share location so that traditional applications can perform file read/write operations against the target object store without having to know the intricacies associated with the object store's application programming interfaces (APIs) and constructs. In order to provide such advantages, EMC CloudBoost stores files using proprietary storage processes after filtering the data through deduplication, compression and encryption processes.

One of the challenges in using such a proprietary storage process, however, is that during restoration/retrieval of the backed-up data the EMC CloudBoost proprietary storage processes may not be available, such as when retrieving and reconstructing the proprietarily stored data in a different datacenter or from a public cloud, including during a disaster recovery scenario.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating a manifest file format in a storage system according to one embodiment of the invention.

DETAILED DESCRIPTION

Figure 1:
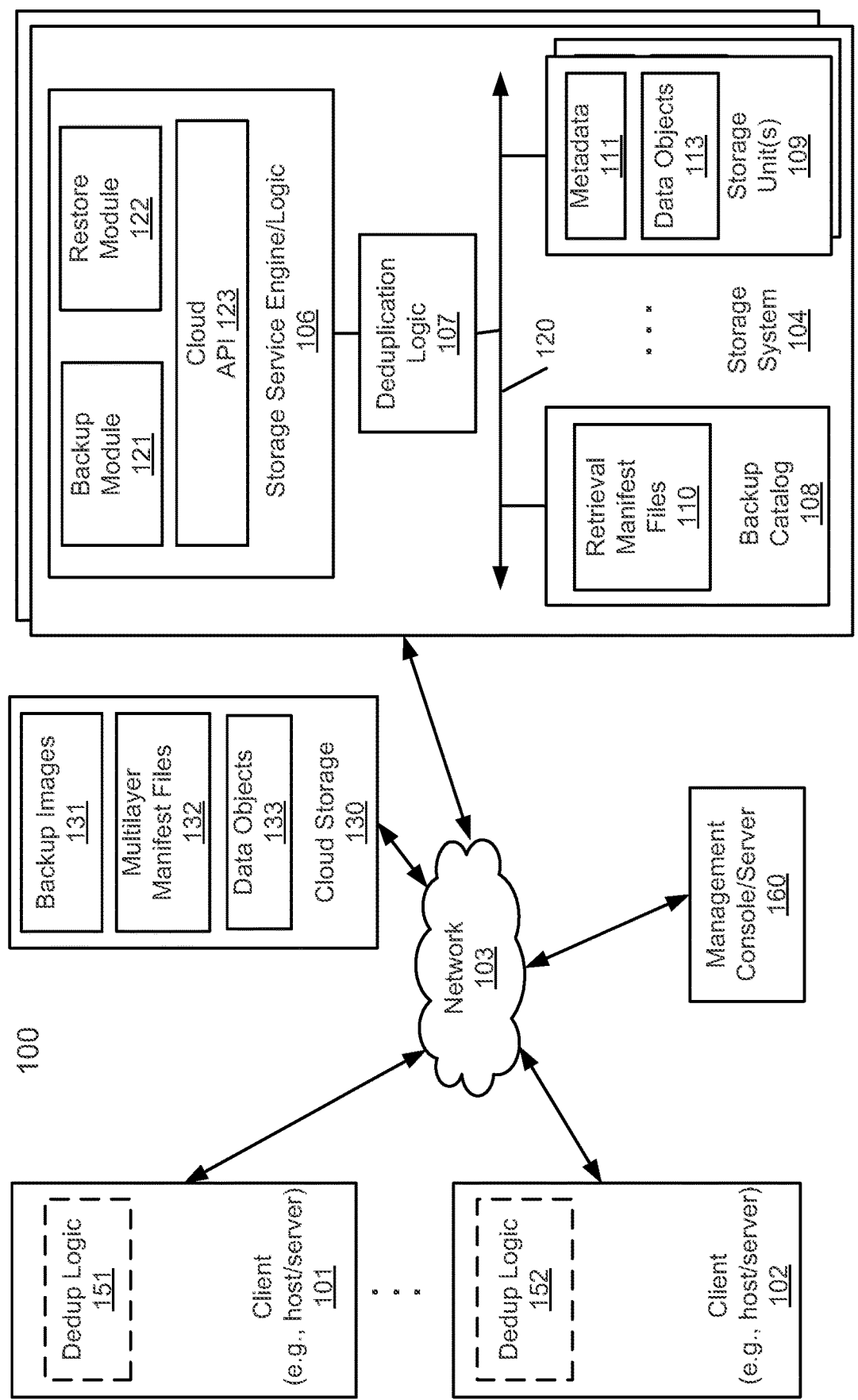
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

To facilitate the retrieval of files, including large virtual machine backup images written to cloud-based storage using proprietary storage systems, such as EMC CloudBoost, embodiments of a novel multilayer manifest process is described. Among other advantages, the multilayer manifest process facilitates the recovery of data at a target site without requiring a deployment of the proprietary storage system in accordance with embodiments of the invention.

In accordance with one embodiment, a multilayer manifest process represents a file F written to an object store using a family of one or more manifest files $F_{M1}$-$F_{Mn}$. The manifest files are generated at the time the file F is written to the object store with proprietary data storage processes, including storage processes for deduplication and segmentation. Advantageously, the manifest files $F_{M1}$-$F_{Mn}$. include all the necessary information to reconstruct the file F from the object store without using the proprietary storage processes with which the file F was written. In one embodiment, the one or more manifest files $F_{M1}$-$F_{Mn}$ are integrated with a backup catalog for secure and easy access.

In accordance with one embodiment, the proprietary storage processes used to write the file F to an object store, or to synchronize the file F to cloud storage, includes processes to break the file F into chunks prior to synchronizing those chunks of data to the cloud storage. Each chunk of data is associated with vital information, where the vital information is any information needed to reconstruct the data into the original file F where such vital information is obtained using the proprietary storage processes.

In accordance with one embodiment the vital information includes file information, chunk information and container information. For example, among other data, the vital information can include a container or bucket ID identifying the uber-level container or bucket in the object store into which the chunks of data are stored, an object ID identifying an individual chunk in the object store, a size of the chunk or object, such as its length, a compression state indicating whether the chunk was compressed before writing to the object store and, if so, identifying the compression algorithm, an encryption type and key identifying the encryption algorithm and key value for encrypting the chunk, and an object store URL representing the chunk in the object store.

In accordance with one embodiment, the vital information is used to generate the one or more multilayer manifest files $F_{M1}$-$F_{Mn}$. In turn, the multilayer manifest files $F_{M1}$-$F_{Mn}$ can be used to reconstruct the original data file F without access to the proprietary processes with which the file F was initially stored or synchronized to the cloud. The manifest files $F_{M1}$-$F_{Mn}$ are typically generated when the file F is stored and its objects synchronized to cloud storage. In one embodiment, the manifest files can be generated on demand or when the file is initially written to a file system and thereafter updated as needed.

In accordance with one embodiment, the one or more multilayer manifest files $F_{M1}$-$F_{Mn}$ are successively generated until a manifest file is generated that is small enough to be stored in an backup catalog, such as a backup catalog that is stored or accessed securely onsite. The final manifest file $F_{Mn}$ compactly represents in a self-contained format an ancestral record of the original file F for which it was generated, where the ancestral record can be used to initiate recovery of original file F without using the proprietary storage processes for storing the original file F.

In one embodiment, during reconstruction, each manifest file in the family of manifest files $F_{M1}$-$F_{Mn}$ is reconstructed in accordance with its contents, beginning with the final manifest file that was small enough to be stored in the on-premise catalog. Each reconstructed manifest file is used to locate the next manifest file $F_{Mn-1}$ in the family of manifest files. Each successive reconstruction eventually results in the reconstruction of the first manifest file $F_{M1}$ in the family of manifest files. In accordance with one embodiment, the reconstructed first manifest file $F_{M1}$ is used to reconstruct the original file F for which the family of manifest files $F_{M1}$-$F_{Mn}$ was generated.

In one embodiment, while the final manifest file is small enough to be securely stored in the on-premise catalog, the rest of the family of manifest files are large enough to warrant secure storage in object storage, including in cloud-based storage accessible only with valid credentials. Because the file F may be securely recovered through initiating reconstruction using the securely stored and final and smallest manifest file $F_{Mn}$ in the family of manifest files $F_{M1}$-$F_{Mn}$, i.e. the ancestral record, and because the remaining members of the family of manifest files $F_{M1}$-$F_{Mn-1}$ can only be accessed after reconstructing the ancestral record, file $F_{Mn}$, the process of recovering and reconstructing the original file F is both efficient and secure.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other.

Storage service engine 106 may represent any storage service related components configured or adapted to provide storage services (e.g., storage as a service) to a variety of clients using any of the access protocols set forth above. For example, storage service engine 106 may include backup logic 121, restore logic 122 and cloud API 123, for providing storage services for cloud-enabled storage 130, including a cloud application programming interface (API) to access data stored in the cloud such as retrieving multilayer manifest files for retrieving and reconstructing backup images 131, as well as an API to obtain vital information about the data stored in the cloud.

In one embodiment, backup logic 121 is configured to receive and back up data from a client (e.g., clients 101-102) and to store the backup data in any one or more of storage units 109 or in a backup catalog 108. Restore logic 122 is configured to retrieve and restore/reconstruct backup data from any one or more of storage units 109, or from backup catalog 108 and cloud storage 130 in conjunction with cloud API 123 as explained in further detail below. The restored/reconstructed data is sent back to a client (e.g., clients 101-102).

Storage units 109 and backup catalog 108 may be implemented locally (e.g., single node operating environment) or remotely (e.g., multi-node operating environment) via interconnect 120, which may be a bus and/or a network (e.g., a storage network or a network similar to network 103). Storage units 109 and backup catalog 108 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 109 and backup catalog 108 may be located locally or remotely accessible over a network, including being located in cloud-enabled storage 130.

In response to a data file to be stored in storage units 109, or to be synchronized to cloud storage 130 and/or backup catalog 108, according to one embodiment, deduplication logic 107 is configured to segment the data file or manifest files into data objects 113/133 in the form of multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the data file or manifest file using the previously stored segment. As a result, segments 113/133 of data files and manifest files are stored in a deduplicated manner, either within each of storage units 109, backup catalog 108, or across at least some of the storage units and/or catalog, or cloud storage. The metadata, such as metadata 111, may be stored in at least some of storage units 109, such that files can be accessed independent of another storage unit. Metadata of each storage unit includes enough information to provide access to the files it contains. In a similar fashion, the multilayer manifest files 132 and retrieval manifest files 110, may be stored in cloud storage 130 and backup catalog 108 and accessed independently of one another, each manifest file including enough vital information to provide access to an associated manifest file or to the original data file for which the manifest files were created.

In response to a data file being synchronized to cloud storage 130, according to one embodiment, the storage service engine 106 and cloud API 123 are configured to generate the manifest files 110 and 132 for data files that are subject to deduplication. Manifest file 110 is a retrieval manifest file that represents an ancestral record of the data file, where the ancestral record is used to initiate retrieval and reconstruction of all of the other manifest files with which it is associated, i.e. the family of manifest files for a particular data file. In a typical embodiment, the manifest files are generated automatically upon synchronization of a data file to the cloud storage 130, but they could also be generated for data files already synchronized to cloud storage on demand. The ancestral record, or retrieval manifest file 110, is typically stored on or is otherwise accessible in a backup catalog 108. Upon receiving a request to restore a data file, the restore module 122 operates in conjunction with the backup catalog 108 to access the retrieval manifest file 110 associated with the data file, and initiates the processes for retrieving the entire family of multilayer manifest files 132 from cloud storage 130 or other long term storage, and begins reconstructing the data file.

The types of data files for which the multilayer manifest files 110/132 are created can include any type of file, but typically are large files such as virtual system images that would require significant resources to store and to reconstruct, but that may also be mission critical in a disaster recovery scenario. Additional details of the processes for generating and retrieving the multilayer manifest files for recovery and/or restoration of data files is described with reference to FIGS. 2-5.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmitting data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). An administrator of management console or server 160 may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
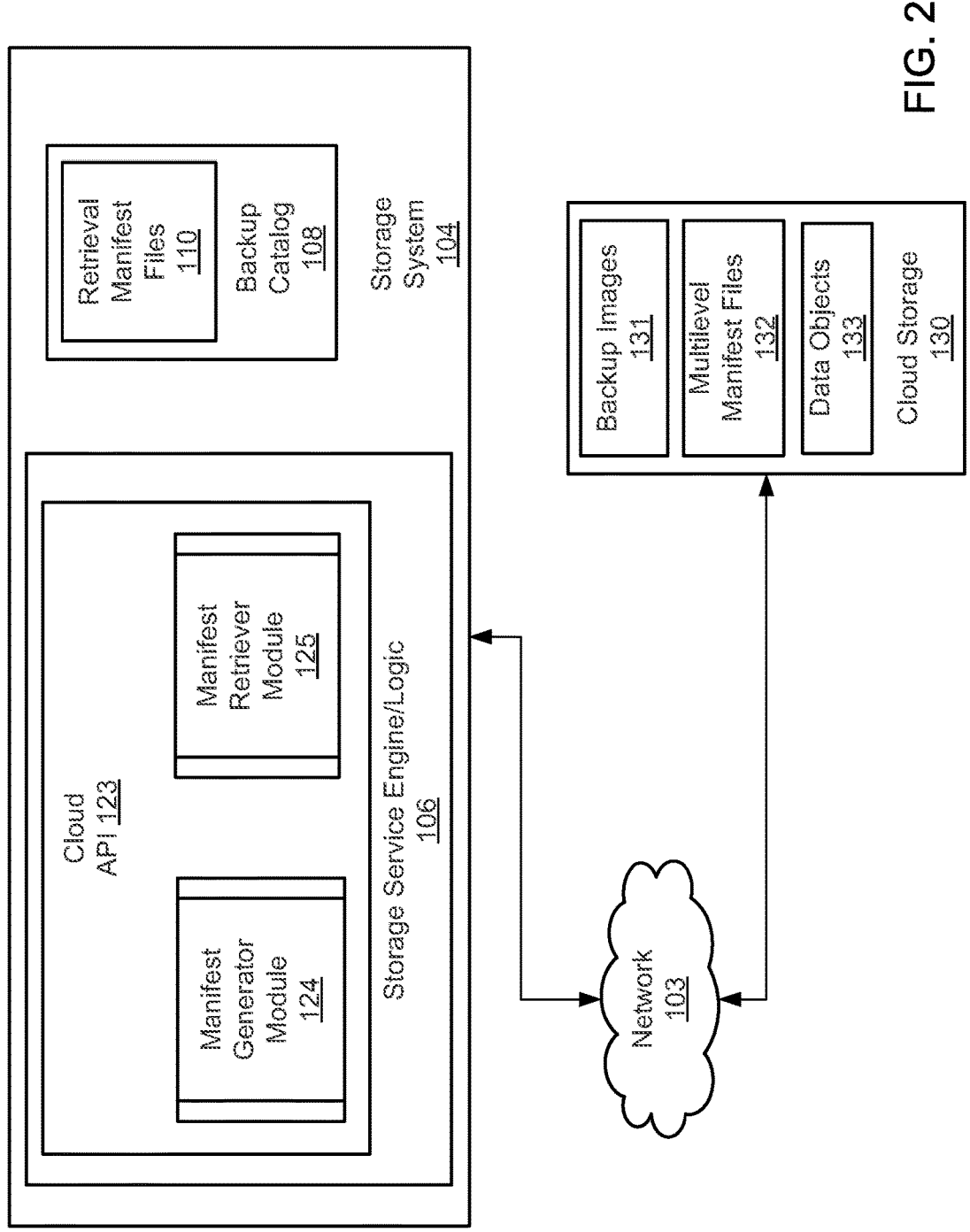
FIG. 2 is a block diagram illustrating a storage system in further detail according to one embodiment of the invention.

FIG. 2 is a block diagram illustrating further details of storage system 200 including storage system 104 having the storage service engine 106 and the cloud API 123, including a manifest generator module 124 and a manifest retriever module 125, and the backup catalog 108 on which is stored the retrieval manifest files 110, i.e. the ancestral records associated with the data files for which multilayer manifest retrieval and reconstruction capabilities are desired.

Figure 3:
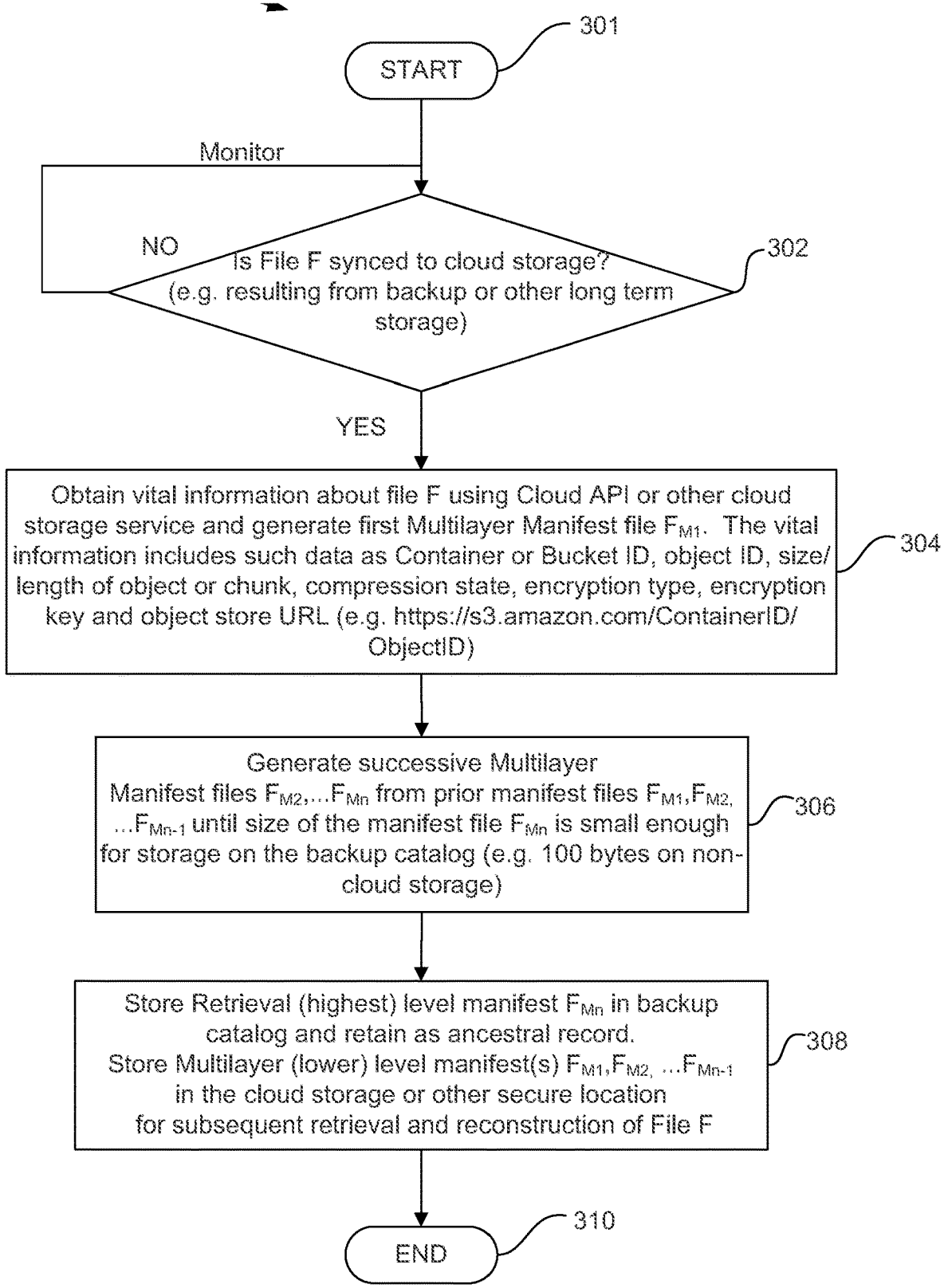
FIG. 3 is a flow diagram illustrating processes for a manifest generation process in a storage system according to one embodiment of the invention.
Figure 4:
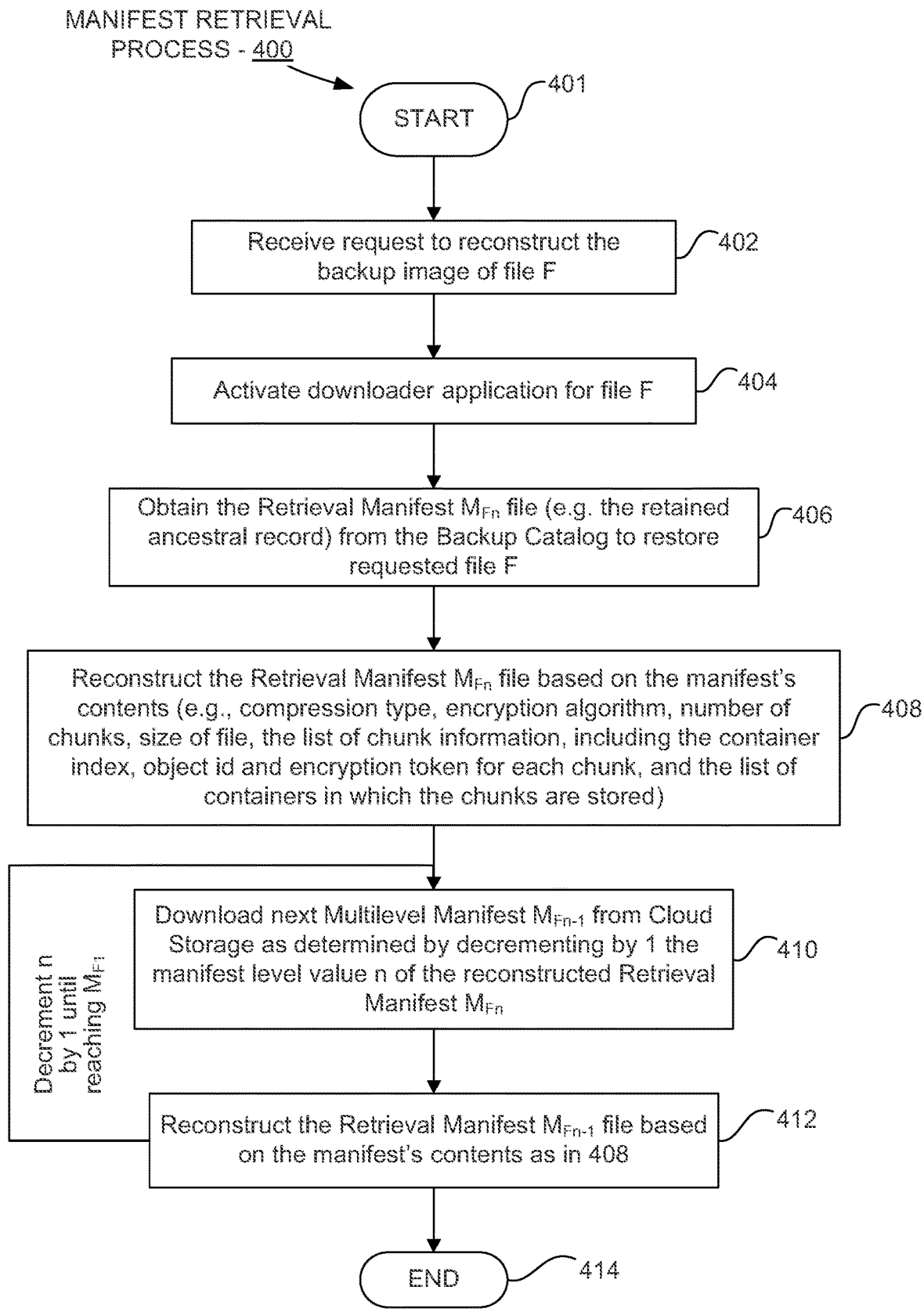
FIG. 4 is a flow diagram illustrating processes for a manifest retrieval process in a storage system according to one embodiment of the invention.

FIGS. 3-4 are flow diagrams illustrating processes 300/400 for generating multilayer manifest files to support future retrieval and reconstruction of data files that have been synchronized to cloud storage or otherwise stored in an object store in accordance with a proprietary object storage process. Processes 300/400 may be performed by processing logic that includes hardware (e.g. circuitry, dedicated logic, etc.), software (e.g., embodied on a non-transitory computer readable medium), or a combination thereof. For example, the storage service engine 106, manifest generator module 124 and manifest retriever module 125 and cloud API 123, as illustrated in FIGS. 1 and 2, can perform processes 300/400, and can be embodied in hardware or software or a combination thereof.

With reference to the embodiment illustrated in FIG. 3, the manifest generation process 300 begins by monitoring 302 for a file F synchronized to cloud storage. If so, the process 304 obtains vital information about the file F using the proprietary object storage process, such as via the cloud API, and generates the first multilayer manifest file $F_{M1}$. The first multilayer manifest file $F_{M1}$, although smaller than the data file F for which it is generated, is still typically quite large, and is too large to be of much use. Therefore the process 306 repeats process 304, this time obtaining vital information about the just generated manifest file $F_{M1}$ using the proprietary object storage process, and generating a subsequent multilayer manifest file $F_{M2}$, and so forth until, at process 308, the size of the latest generated manifest file $F_{Mn}$ is determined to be small enough to be useful and capable of being stored in a backup catalog that is either on-site or easily accessible in secure storage in case a disaster or other on-demand recovery effort ensues.

In one embodiment, in process 308, this latest generated manifest file $F_{Mn}$ is stored in the backup catalog and retained as the ancestral record of the data file that triggered the process, i.e. the data file being synchronized to the cloud or otherwise stored in an object store. The process 308 also stores the remaining manifest files in the family of manifest files just generated in cloud storage or other secure location for subsequent retrieval and reconstruction of data file F.

In an example scenario of implementing the manifest generation process 300, for a large file such as virtual machine backup images (VHDs, VMDKs), a manifest representation of the file can itself be large enough so as to pose a storage challenge. The manifest generation process 300 addresses the problem by storing the lower level (larger) manifests in an object store until the process 300 has generated a manifest with a manageable size. Thus, for a virtual machine backup image of size 250 GB for which a manifest-based non-proprietary recovery capability is desired, the manifest generation process 300 could generate a first level manifest file of around 80 MB, a second level manifest file of around 25 KB, and a third level manifest file of around 100 Bytes. For recovery purposes, the large backup image and first and second level manifests could be securely stored in a primary object store using, for example, EMC CloudBoost, and the third and highest level manifest file, also referred to herein as the retrieval manifest file or the ancestral record, could be stored in a secure backup catalog, for example, in the EMC DPC Catalog.

As will be described with reference to FIG. 4, a downloader application can retrieve the highest level manifest from the secure backup catalog (or other location that is easily accessed in a disaster recovery scenario) and use the highest level manifest file to iteratively download the other manifest files and finally the actual backup image. The manifest file format is designed to be self-contained to allow such logic to work.

With reference to the embodiment illustrated in FIG. 4, the manifest retrieval process 400 begins by receiving 402 a request to recover or restore a data file F, such as a request to reconstruct a backup image file F. Responsive to receiving the request, the process activates 404 a downloader application for the file F, and obtains 406 a retrieval manifest file that was previously generated for file F at the time it was originally synchronized to cloud storage. The retrieval manifest file is also referred to herein as the ancestral record for file F since it can be used to reconstruct the entire file F, e.g. the entire backup image. Of course, not every piece of information is contained in the ancestral record itself, but through the use of the manifest retrieval process 400, the ancestral record provides the starting point for reconstructing the file F.

In process 408, for example, the manifest retrieval process first reconstructs the retrieval manifest file $F_{Mn}$ based on the manifest file's contents described in further detail with reference to FIG. 5. Once retrieval manifest file $F_{Mn}$ is reconstructed, processes 410 and 412 are repeated, reversing their way through the manifest files until all of the multilayer manifest files $F_{M1}$, $F_{M2}$, ..., $F_{Mn-1}$, $F_{Mn}$ are retrieved and reconstructed. The reconstruction of the final multilayer manifest file $F_{M1}$ in the family of manifest files results in the reconstruction of the original data file F for which the multilayer manifest files were generated. This is because the final multilayer manifest file $F_{M1}$ in the family is the first multilayer manifest file that was generated directly from the vital information obtained for original data file F as described in process 300.

FIG. 5 is a block diagram illustrating a manifest file format 500 in accordance with one embodiment of the invention. Recall that the data contained in each of the manifest files is vital information obtained about the file at the time it was stored in an object store or synchronized to cloud storage. In order to provide a self-contained manifest file format that facilitates ease of reconstruction without reference to proprietary protocols, but that remains secure and compact, the manifest file format 500 specifies how the vital information is formatted and/or encoded.

As shown, the multilayer file format 500 consists of at least three types of data, including the manifest file information 502, the chunk information 504 and the container information 506. As noted, the multilayer file format 500 is a self-contained format for each of the multilayer manifest files in a family of manifest files, such that the formatted information contained in each manifest file can be used to reconstruct the manifest file without having to reference or access the particulars of the proprietary object storage processes used to store the data file F for which the manifest files were generated. This self-contained format advantageously facilitates the recovery and reconstruction of the associated data file through successive iterations of a manifest retrieval process such as the process described with reference to FIG. 4.

In accordance with one embodiment, the file information 502 includes a level integer identifying the level of a particular manifest file within the hierarchy of the manifest family of files that were generated for a particular data file. As indicated, the highest level, level N, is the retrieval manifest file, so named because it is the manifest file that initiates the entire retrieval process for reconstructing a data file. The retrieval manifest file is also the smallest of the manifest files and is typically stored in a backup catalog for secure and easy access should recovery and restoration of the underlying data file F be needed.

In one embodiment, the compression type value in the file info 502 is any one of several integer values 0, 2, 4, 8, and 16 to specify the type of compression used to compress the chunks that comprise the manifest file, such as compression types LZNT1, DEFLATE, SNAPPY, LZ4, or none. In one embodiment, the encryption algorithm and associated key are specified as part of the file information. In one embodiment, the total number of chunks that comprise the manifest file is specified to facilitate multi-threaded downloading of the chunks by splitting the entire chunk map into smaller parts. Lastly, the total size of the manifest file is specified.

In one embodiment, the end of the file information 502 section is demarcated with a blank line or record in the manifest file, or some other method of indicating the end of the section.

In one embodiment, the file info 502 section is followed by the chunk info 504 section. As illustrated, the chunk info 504 section is formatted as a table or array of information about each of the chunks that comprise the manifest file, including the offset location of the chunk, the container index to the list of container names included in the manifest file (as described below with reference to container info 506 section), the object ID associated with the chunk, and lastly the base 64 encryption token used to decrypt the chunk for reconstruction. In one embodiment, the end of the chunk info 504 section is demarcated with a blank line or record in the manifest file, or some other method of indicating the end of the section.

In one embodiment, the chunk info 504 section is followed by the container info 506 section. As illustrated, the container info 506 section is formatted as an indexed list of container names that correspond to the container indices specified in the foregoing chunk info 504 section. In one embodiment, the container indexing scheme starts with index 1, but other types of indexing schemes could be used as long as they correspond to the type of index used in the corresponding chunk info 504 section.

In one embodiment, for sparse manifest files, i.e. manifest files that have gaps or "holes" in the data, the chunk info 504 section uses a container index of zero or some other designated number or alphanumeric indicator that points to a null container of "EMPTY" or some other similarly designated null container. In the illustrated embodiment, in the case of a HOLES designation identifying a gap in the data, the name of the null container is represented by word "EMPTY." Other techniques to encode or format the vital information contained in the manifest files can be used to reduce the manifest file size or simplify reconstruction.

Figure 6:
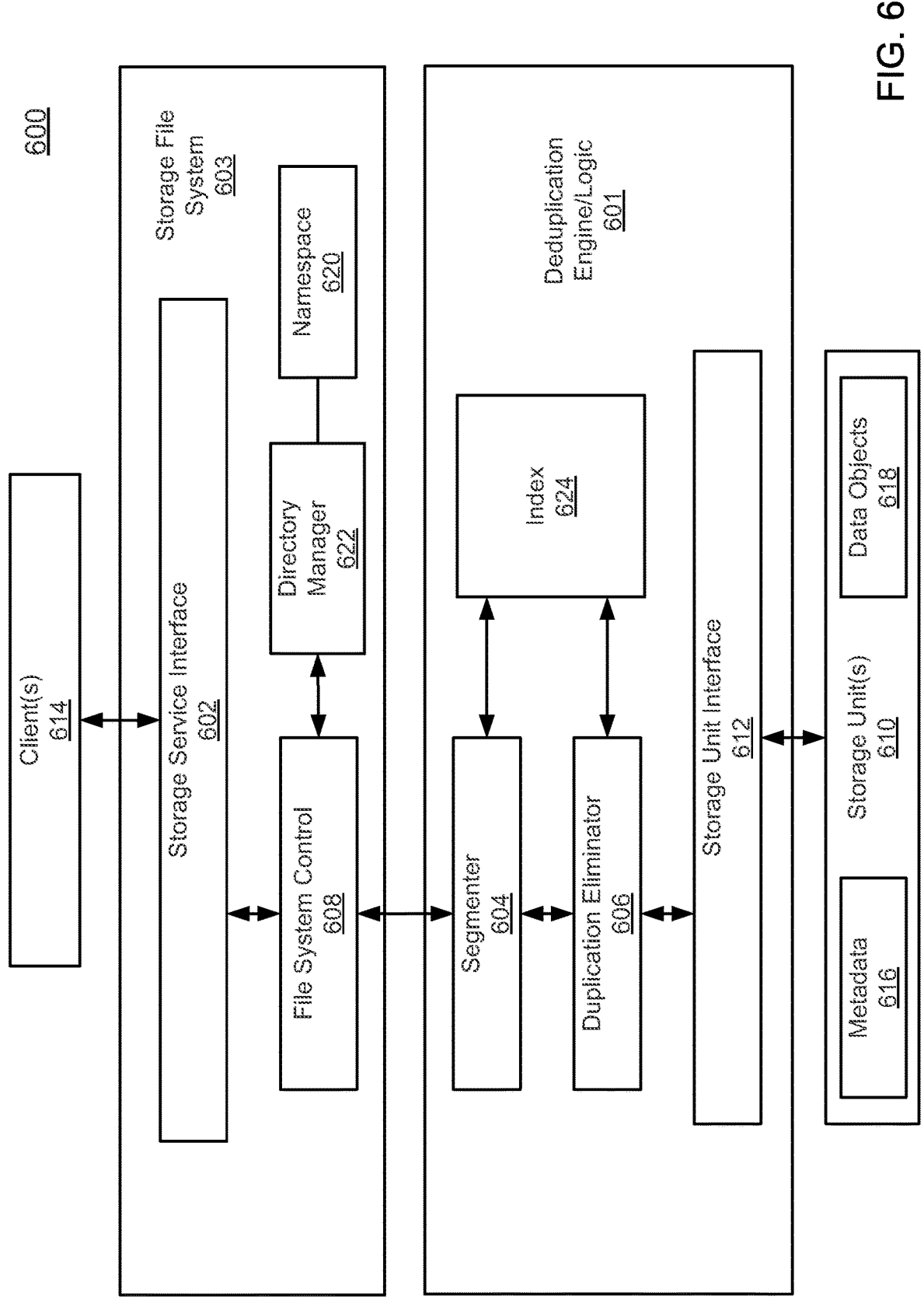
FIG. 6 is a block diagram illustrating a general overview of a system environment for providing a storage system according to one embodiment of the invention.

FIG. 6 is a block diagram illustrating a deduplication storage system according to one embodiment of the invention. For example, deduplication storage system 600 is implemented as part of the storage system 600 as described above, such as, for example, the deduplication storage system as a client and/or a server described above. In one embodiment, storage system 600 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 600 may have a distributed architecture, or all of its components may be integrated into a single unit. Storage system 600 may be implemented as part of an archive and/or backup system, or a disaster recovery system, such as a deduplicating storage system available from EMC® Corporation of Hopkinton, Mass.

In one embodiment, storage system 600 includes deduplication logic 601 interfacing one or more clients 614, via file system 603, with one or more storage units 610 storing metadata 616 and data objects 618. Clients 614 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 610 may be implemented locally (e.g., single node operating environment) or remotely (e.g., multi-node operating environment) via an interconnect, which may be a bus and/or a network (e.g., a storage network). In one embodiment, one of storage units 610 operates as an active storage to receive and store external or fresh user data from a client (e.g., an end-user client or a primary storage system associated with one or more end-user clients), while the another one of storage units 610 operates as a target storage unit to periodically archive data from the active storage unit according to an archiving policy or scheme.

Storage units 610 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 610 may also be combinations of such devices. In the case of disk storage media, the storage units 610 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 616, may be stored in at least some of storage units 610, such that files can be accessed independent of another storage unit. Metadata of each storage unit includes enough information to provide access to the files it contains. In one embodiment, metadata may include fingerprints or representatives contained within data objects 618, where a data object may represent a data segment (also referred to as a data chunk), a compression region (CR) of one or more data segments, or a container of one or more CRs. Fingerprints are mapped to a particular data object via metadata 616, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 616 may include a file name, a storage unit identifier (ID) identifying a storage unit in which the segments associated with the file name are stored, reconstruction information for the file using the segments, and any other appropriate metadata information. Metadata 616 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, storage file system 603 includes file service interface 602, file system control logic 608, directory manager 622, and namespace 620. Deduplication logic 601 includes segmenter 604 (also referred to as a segmenting module or unit), duplication eliminator 606, and storage unit interface 612. File system control 608 receives a file or files (or data item(s)) via file service interface 602, which may be part of a file system namespace 620 of file system 603 associated with the deduplication logic 601. The file system namespace 620 refers to the way files are identified and organized in the system. An example is to organize the files hierarchically into directories or folders, which may be managed by directory manager 622. File service interface 602 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 604 and file system control 608. Segmenter 604, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 608, also referred to as a file system manager, processes information to indicate the segment(s) association with a file. In some embodiments, a list of fingerprints is used to indicate segment(s) associated with a file. File system control 608 passes segment association information (e.g., representative data such as a fingerprint) to index 624. Index 624 is used to locate stored segments in storage units 610 via storage unit interface 612. In one embodiment, index 624 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 624 maps a fingerprint of a segment to a container identifier identifying a container that contains the corresponding segment.

In one embodiment, index 624 includes a persistent hash-table of segment-IDs keyed either by the digest of the data stored in the segment or by the deduplication key of the data stored in the segment. The index 624 need not contain entries for every data segment in the deduplication domain, but the effectiveness of deduplication is a function of the number of entries stored in the index 624. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 624) that maintains a digest (e.g., SHA checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 606, also referred to as a segment store, identifies whether a newly received segment has already been stored in storage units 610. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 610 that make up the file. Segments are then packed by a container manager (which may be implemented as part of storage unit interface 612) into one or more storage containers stored in storage units 610. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 602 is configured to communicate with file system control 608 to identify appropriate segments stored in storage units 610 via storage unit interface 612. Storage unit interface 612 may be implemented as part of a container manager. File system control 608 communicates (e.g., via segmenter 604) with index 624 to locate appropriate segments stored in storage units via storage unit interface 612. Appropriate segments are retrieved from the associated containers via the container manager and are used to construct the requested file. The file is provided via file service interface 602 in response to the request. In one embodiment, file system control 608 utilizes a tree (e.g., a segment tree obtained from namespace 620) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 600 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 601) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
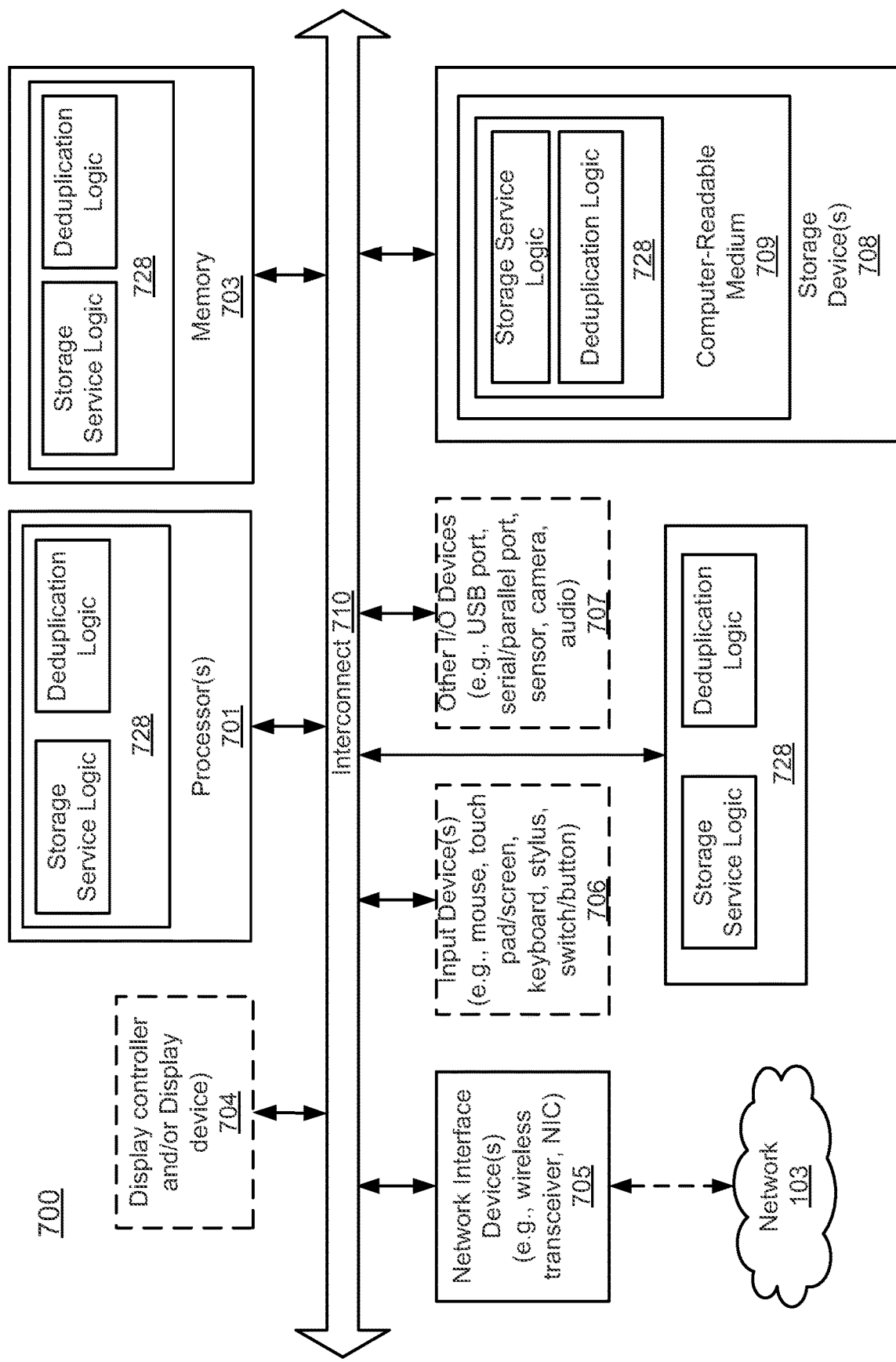
FIG. 7 is a block diagram illustrating a general overview of a data processing system environment for providing a storage system according to one embodiment of the invention.

FIG. 7 is a block diagram illustrating an example of a data processing system that may be used with one embodiment of the invention. For example, system 700 may represents any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations and steps discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 700 may further include IO devices such as devices 705-708, including network interface device(s) 705, optional input device(s) 706, and other optional IO device(s) 707. Network interface device 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., physical keyboard or a virtual keyboard displayed as part of a touch sensitive screen). For example, input device 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-accessible storage medium 709 (also known as a machine-readable storage medium or a computer-readable medium) on which is stored one or more sets of instructions or software (e.g., module, unit, and/or logic 728) embodying any one or more of the methodologies or functions described herein. Module/unit/logic 728 may also reside, completely or at least partially, within memory 703 and/or within processor 701 during execution thereof by data processing system 700, memory 703 and processor 701 also constituting machine-accessible storage media. Module/unit/logic 728 may further be transmitted or received over a network via network interface device 705.

Computer-readable storage medium 709 may also be used to store the some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 728, components and other features described herein can be implemented as discrete hardware components or integrated in the functionality of hardware components such as ASICS, FPGAs, DSPs or similar devices. In addition, module/unit/logic 728 can be implemented as firmware or functional circuitry within hardware devices. Further, module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for recovering files stored in an object store, the method comprising:
retrieving an ancestral record representing a file in an ancestral record, wherein the ancestral record is associated with one or more manifest files, wherein each of the one or more manifest files contains vital information needed to recover the file, the vital information having been obtained using a proprietary storage process for writing the file to an object store;
successively reconstructing each of the one or more manifest files associated with the ancestral record;
reconstructing the ancestral record based on the vital information contained in the ancestral record;
accessing a next manifest file of the one or more manifest files, the next manifest file identified during reconstructing the ancestral record;
reconstructing the next manifest file of the one or more manifest files based on the vital information contained in the next manifest file; and
repeating accessing and reconstructing the next manifest file until all of the one or more manifest files have been accessed and reconstructed, wherein reconstructing the last manifest file results in recovering the file.

2. The computer-implemented method of claim 1, the vital information having a self-contained format enabling reconstructing without relying on the proprietary storage process used to obtain the vital information, the self-contained format including a file information, a chunk information and a container information.

3. The computer-implemented method of claim 2, wherein the file information includes any one or more of a manifest level identifying a hierarchical level of the manifest file in the one or more manifest files, a compression type, an encryption algorithm, a total number of chunks, and a size associated with one of the one or more manifest files.

4. The computer-implemented method of claim 2, wherein the chunk information is a first array of one or more of an offset, a container index, an object ID and an encryption token each element in the first array associated with a chunk of data for reconstructing the manifest file.

5. The computer-implemented method of claim 2, wherein the container information is a second array of containers indexed according to the container index, each container identifying a container in which the indexed chunk of data is contained.

6. The computer-implemented method of claim 5, wherein the container index identifies an empty container to account for sparse data.

7. A data processing system, comprising:
- a first storage in which to store an ancestral record representing a file, wherein the ancestral record is associated with one or more manifest files, where each of the one or more manifest files contains vital information needed to recover the file; and
- a processor in communication with the first storage, the processor configured to:
  - retrieving the ancestral record,
  - successively reconstructing each of the one or more manifest files associated with the ancestral record,
  - obtain the vital information associated with each recovered manifest file using a proprietary storage process for writing the file to an object store,
  - recover the file based on the vital information without using the proprietary storage process,
  - reconstruct the ancestral record based on the vital information contained in the ancestral record,
  - access from the second storage a next manifest file of the one or more manifest files, the next manifest file identified during reconstructing the ancestral record,
  - reconstruct the next manifest file of the one or more manifest files based on the vital information contained in the next manifest file, and
  - repeat processes to access and reconstruct the next manifest file until all of the one or more manifest files have been accessed and reconstructed,
  - wherein to reconstruct the last manifest file results in recovering the file.

8. The data processing system of claim 7, wherein the vital information is configured in a self-contained format enabling the processor to access and reconstruct the one or more manifest files without relying on the proprietary storage process used to obtain the vital information, the self-contained format including a file information, a chunk information and a container information.

9. The data processing system of claim 8, wherein the file information includes any one or more of a manifest level identifying a hierarchical level of the manifest file in the one or more manifest files, a compression type, an encryption algorithm, a total number of chunks, and a size associated with one of the one or more manifest files.

10. The data processing system of claim 8, wherein the chunk information is a first array of one or more of an offset, a container index, an object ID and an encryption token each element in the first array associated with a chunk of data for reconstructing the manifest file.

11. The data processing system of claim 8, wherein the container information is a second array of containers indexed according to the container index, each container identifying a container in which the indexed chunk of data is contained.

12. The data processing system of claim 11, wherein the container index identifies an empty container to account for sparse data.

13. A non-transitory computer-readable storage medium having instructions stored therein, which when executed by a processor, cause the processor to perform operations for recovering a file in a storage system, the operations comprising:
- retrieving an ancestral record representing a file in an ancestral record, wherein the ancestral record is associated with one or more manifest files, wherein each of the one or more manifest files contains vital information needed to recover the file, the vital information having been obtained using a proprietary storage process for writing the file to an object store;
- successively reconstructing each of the one or more manifest files associated with the ancestral record;
- recovering the file based on the vital information associated with each recovered manifest file without using the proprietary storage process;
- reconstructing the ancestral record based on the vital information contained in the ancestral record;
- accessing a next manifest file of the one or more manifest files, the next manifest file identified during reconstructing the ancestral record;
- reconstructing the next manifest file of the one or more manifest files based on the vital information contained in the next manifest file; and
- repeating accessing and reconstructing the next manifest file until all of the one or more manifest files have been accessed and reconstructed, wherein reconstructing the last manifest file results in recovering the file.

14. The non-transitory computer-readable storage medium of claim 13, the vital information having a self-contained format enabling reconstructing without relying on the proprietary storage process used to obtain the vital information, the self-contained format including a file information, a chunk information and a container information.

15. The non-transitory computer-readable storage medium of claim 14, wherein the file information includes any one or more of a manifest level identifying a hierarchical level of the manifest file in the one or more manifest files, a compression type, an encryption algorithm, a total number of chunks, and a size associated with one of the one or more manifest files.

16. The non-transitory computer-readable storage medium of claim 14, wherein the chunk information is a first array of one or more of an offset, a container index, an object ID and an encryption token each element in the first array associated with a chunk of data for reconstructing the manifest file.

17. The non-transitory computer-readable storage medium of claim 14, wherein the container information is a second array of containers indexed according to the container index, each container identifying a container in which the indexed chunk of data is contained, including an empty container index identifying an empty container to account for sparse data.

18. The computer-implemented method of claim 3, wherein the compression type is associated with a compression type value used to specify a type of compression used to compress the chunks that comprise the manifest file.

19. The data processing system of claim 9, wherein the compression type is associated with a compression type value used to specify a type of compression used to compress the chunks that comprise the manifest file.

20. The non-transitory computer-readable storage medium of claim 15, wherein the compression type is associated with a compression type value used to specify a type of compression used to compress the chunks that comprise the manifest file.

* * * * *